United States Patent [19]

McDonald

[11] 4,030,506
[45] June 21, 1977

[54] EARLOBE PIERCING DEVICE
[75] Inventor: David McDonald, Mill Valley, Calif.
[73] Assignee: Golden M Enterprises, Inc., Mill Valley, Calif.
[22] Filed: Dec. 15, 1975
[21] Appl. No.: 641,197
[52] U.S. Cl. .................................. 128/330; 227/124
[51] Int. Cl.² ....................... A61B 17/00; B25C 5/06
[58] Field of Search ............. 40/300, 301; 128/330; 227/124, 132, 143, 146

[56] References Cited
UNITED STATES PATENTS

| 1,830,650 | 11/1931 | Falk ..................................... 227/124 |
| 2,570,048 | 10/1951 | Cooke et al. .................. 128/330 X |
| 3,641,804 | 2/1972 | Oudenhoven .................. 128/330 X |
| 3,941,134 | 3/1976 | McDonald .......................... 128/330 |
| 3,943,935 | 3/1976 | Cameron ............................ 128/330 |

Primary Examiner—Channing L. Pace
Attorney, Agent, or Firm—Townsend and Townsend

[57] ABSTRACT

An apparatus for piercing earlobes which comprises a pair of elongated, hand-held, parallel bars that can be moved towards and away from each other while an earlobe is positioned between the bars adjacent an end thereof. At that same end, one of the bars mounts an axially movable plunger to which an earlobe piercing stud can be attached. A compression spring drives the plunger and therewith the stud towards the second bar for piercing the ear. First and second levers are positioned for actuation by the same hand holding the piercing apparatus for retracting or cocking the plunger and for releasing it to pierce the earlobe. The second bar includes a recess into which a clip can be inserted which has an aperture for frictionally engaging the stud and retaining the stud to the earlobe after the latter has been pierced. The recess aligns the aperture with the axis of the plunger and a flat leaf spring is mounted to the second bar to bias the clip into the recess and retain it therein in its properly aligned position. The extent to which the two bars can be moved towards each other is adjustable.

15 Claims, 6 Drawing Figures

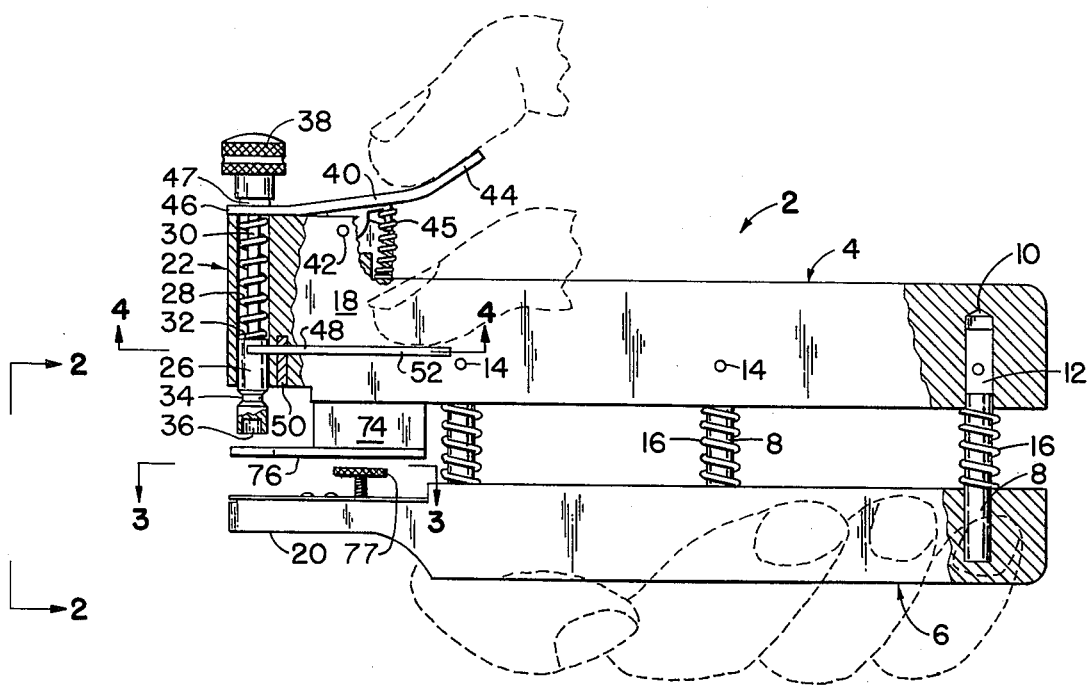
FIG._1.
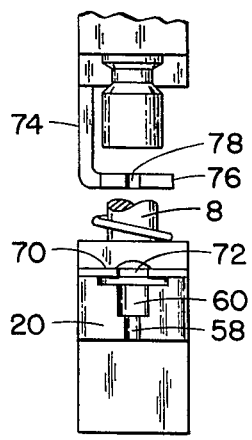
FIG._2.
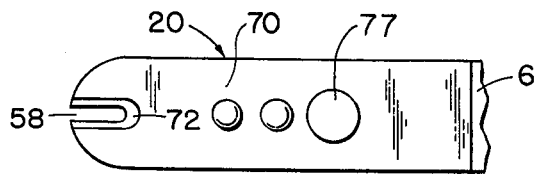
FIG._3.
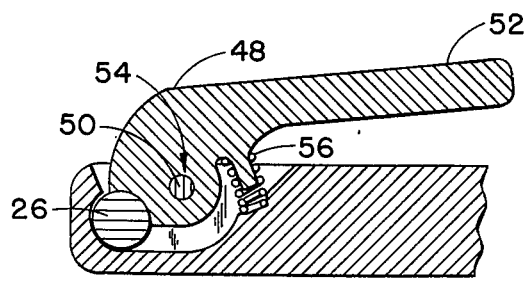
FIG._4.
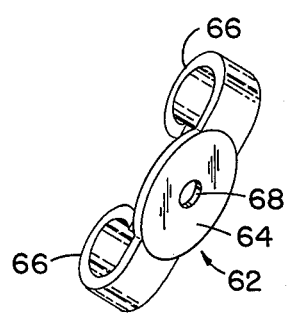
FIG._6.
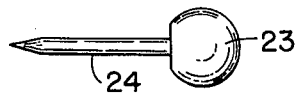
FIG._5.

EARLOBE PIERCING DEVICE

BACKGROUND OF THE INVENTION

The present invention relates to earlobe piercing devices such as are disclosed, for example, in U.S. Pat. No. 3,187,751 and German Pat. No. 95,452.

The German patent discloses an earlobe piercer which has a pair of linearly movable jaws with an earlobe piercing needle fixedly mounted to one of the jaws so that the needle pierces the earlobe when the jaws are moved towards each other. It further discloses a device for inserting an earring while the needle is withdrawn from the earlobe.

The referenced U.S. patent discloses an hand-held instrument which has opposed jaws that are movable towards and away from each other with a pair of handles pivotally connected to the jaws. The earlobe to be pierced is placed between the jaws. One of the jaws is provided with means for receiving a pointed stud and driving it through the earlobe while the latter is clamped between the jaws. The other of the two jaws has means for receiving the ends of the stud which passes through the lobe. The device is constructed so that the instrument is readily removed after the earlobe has been pierced by simply moving the device in a direction perpendicular to the stud axis and downwardly away from the lobe.

Prior art earlobe piercers of the type discussed above has several drawbacks, one of the more important ones being the fact that an operator requires both hands to properly use them. In the discussed U.S. patent, the piercing stud is driven through the earlobe by a spring actuated plunger. In order to retract the plunger and compress the spring the operator must hold the piercer with one hand and pull on the plunger with his other hand. Moreover, to secure the stud to the earlobe it is necessary to slip a nut or clip over one end of the stud. In accordance with the U.S. patent this operation must be manually performed after withdrawal of the piercing device. This is cumbersome and subjects the patient's earlobe to painful manipulation. Moreover, there is a real danger of contamination and possible subsequent infection of the just pierced earlobe when touched by the operator's fingers.

The device disclosed in the German patent is generally unsatisfactory since it employed a permanent piercing needle which becomes contaminated, which is difficult to cleanse and maintain sterile, and which is slowly forced through the earlobe, thereby causing the person substantial and unnecessary pain and suffering. Additionally, it requires the withdrawal of the needle from the earlobe and its replacement by a permanent earring which causes the patient still further discomfort and which is an additional source for contamination which can lead to infection.

Furthermore, prior art earlobe piercing devices of the type discussed had no provision for adjusting the extent to which the jaws could be moved towards each other. As a result, earlobes being pierced could be pinched or remain loose, depending on their thickness. In either case, this could be painful.

SUMMARY OF THE INVENTION

The present invention employs a compact ear piercing apparatus in which all piercing functions can be performed with a single hand, leaving the operator's second hand free for other tasks. Generally speaking, the earlobe piercing device of the present invention comprises a pair of elongate, parallel first and second bars, means guiding the bars for movement towards and away from each other, means for biasing the bars apart, and means for limiting the maximum extent to which the bars can be spread apart and means for adjustably limiting the extent to which the bars can be moved towards each other. The bars have a sufficient length to be grasped by an operator's hand for moving the bars towards each other. The first bar includes an axially movable plunger and means for axially movably mounting the plunger adjacent an end of the bar. A spring biases the plunger towards the second bar and a shoe secured to the first bar limits the extent to which the plunger can move towards the second bar. An end of the plunger facing the second bar includes means for receiving a earlobe piercing stud. A first lever is mounted to the end of th first bar and connected with the plunger. The first lever is shaped and positioned so that it can be grasped by a finger of the hand operating the device for retracting the plunger in opposition to the spring away from the second bar. A second lever is mounted to the first jaw adjacent the same end and includes means for retaining the plunger in its retracted position. The second lever is also formed and positioned for operation by a finger, e.g., the thumb of the hand holding the bars. Actuation of the second lever releases the plunger and permits the biasing means to force the plunger towards the second bar. The shoe has a guide slot for guiding the stud along an axial travel path aligned with the axis of the plunger into and through the earlobe being pierced.

Furthermore, the second bar includes a recess into which a clip having a piercing stud engaging aperture can be inserted for intercepting th stud when it is driven through the earlobe and thereby fastening the clip to the stud without requiring extensive and painful manipulation by the operator. The recess is positioned so that the aperture in the clip is aligned with the axis of the piston and means such as a flat leaf spring is secured to the second bar to resiliently bias the clip into the recess and to thereby retain it in its position.

Thus, the earlobe piercing device of the present invention permits the operator to literally single-handedly pierce a patient's earlobe. First, the operator places a sterilized clip in the leaf spring covered recess on the second bar by withdrawing the clip with a suitable tool such as tweezers from an alcohol or other sterilizing bath and positioning it in the recess. Thereafter, he grasps the tool with one hand, positions it so that the earlobe is disposed between the jaws and closes his fist to move the jaws together until the earlobe is firmly held therebetween. While holding the bars together, he uses a finger, normally his thumb, to retract the plunger (although the retracting operation can be done before the piercer is placed over the earlobe) and thereafter he actuates the release lever with a finger, e.g., the thumb of the same hand, so that the spring can drive the plunger towards the second bar. This drives the piercing stud through the earlobe and through the aperture in the mounting clip. Thereafter the bars are released and the earlobe piercer is downwardly withdrawn from the earlobe, leaving the piercing stud and the mounting clip behind.

It has further been found that it is desirable to slightly compress the earlobe during the piercing operation. This causes slight numbness and reduces or eliminates pain whiel the earlobe is pierced. For this purpose, an adjustable set screw is provided so that the operator can set the extent to which the bars can be moved towards each other. As a result, the piercing device of the present invention can be equally effectively used on earlobes of differing thicknesses.

From the above it can be seen that the present invention is a substantial improvement over prior art earlobe piercers and earlobe piercing techniques. Yet, because of its simple construction, it is relatively inexpensive.

BRIEF DESCRIPTION OF THE DRAWINGS

FIG. 1 is a side elevational view, partially in section, of an earlobe piercing device constructed in accordance with the invention and illustrates in phantom lines the manner in which the device can be actuated with a single hand;

FIG. 2 is a front elevation and is taken from lines 2—2 of FIG. 1;

FIG. 3 is a fragmentary, enlarged bottom view and is taken from line 3—3 of FIG. 1;

FIG. 4 is a fragmentary view, in section, taken from line 4—4 of FIG. 1.

FIG. 5 is an illustration of a suitable earlobe piercing stud; and

FIG. 6 is an illustration of a stud securing clip.

DESCRIPTION OF THE PREFERRED EMBODIMENTS

Referring to the drawings, an ear piercing device 2 constructed in accordance with the invention generally comprises a pair of elongate, parallel first and second bars 4 and 6 which are interconnected by a plurality, e.g., three posts 8 which permit linear reciprocating movements of the bars towards and away from each other. The posts are firmly secured to one of the bars, for example, they may be pressed into second bar 6, and they are slidable in a bore 10 in first bar 4. The posts include a flattened portion or groove 12 engaged by set screws 14 to limit the reciprocating travel of the bars and to prevent their separation. Compression springs 16 disposed about some or all of the posts urge the bars apart.

A left hand (as seen in FIG. 1) end of the bars defines first and second jaws 18, 20 between which an earlobe about to be pierced can be placed as is more fully described hereinafter. Jaw 18 has a width greater than that of the remainder of bar 4 and mounts an actuating mechanism 22 for driving a piercing stud 24 through an earlobe. The actuating mechanism comprises a plunger 26 axially movably disposed within an elongate bore adjacent the outermost end of jaw 18. A compression spring 28 diposed in part of the bore is disposed about a reduced diameter portion 30 of the plunger and rests against a shoulder 32 to drive the plunger towards second jaw 20. The plunger also includes an annular groove 34 for purposes more fully described below and in its face it includes a recess 36 for receiving the head 23 of ear piercing stud 24.

The reduced diameter portion of the plunger extends past the side of jaw 18 facing away from jaw 20 and terminates in a threaded end (not separately shown) to which a knurled nut 38 is applied. A plunger retracting or cocking lever 40 is pivotable about a pin 42 in jaw 18 and includes a free end 44 protruding past the end of the enlarged jaw so that an operator holding the earlobe piercer by grasping bars 4, 6 with his hand can reach the free end of the lever with one of his fingers, preferably the thumb as illustrated in phantom lines in FIG. 1. The other end of retracting lever 40 is bifurcated and has two arms 46 positioned on each side of reduced diameter section 30 of plunger 26 and engaging the underside of knurled nut 38. When the operator depresses the retracting lever the plunger is pulled back, that is away from second jaw 20 against the force of spring 28. A spring 45 biases the lever in a counter-clockwise direction (as seen in FIG. 1) so that the lever does not hang loosely while the plunger is in its retracted position. An impact dampening O-ring 47 may be placed on the underside of nut 38 to reduce the operating noise of the plunger when it is released.

A plunger retaining and release lever 48 is mounted to one side of jaw 18 and is pivotable about a pivot pin 50. A free end 52 of the release lever is again within reach of the operator's thumb when the operator grasps the piercing device 2. The other end of the release lever extends through a slot 54 in jaw 18 into the bore housing plunger 26. A spring 56 biases this end of the jaw into the slot so that upon retraction of the plunger by retracting lever 40 the release lever 48 engages annular groove 34 and retains the plunger in its retracted position. To release the plunger and permit spring 28 to drive it towards second jaw 20 the free end 52 of the release lever is depressed to retract the plunger engaging end of the lever from the annular groove.

It will be noted that the actual travel of the plunger from the point of release by lever 48 until the underside of knurled nut 38 arrests the travel can be adjusted by threading the nut a greater or lesser distance onto the threaded end of the reduced diameter portion 30 of plunger 26. In this manner the plunger travel can be adjusted to take into account different stud designs, stud lengths, stud head diameters and the like.

The second jaw 20 has a slot 58 which extends over its full width (see FIG. 2), and which is of sufficient depth and orientation so that it is in alignment with the axis of plunger 26. The width of the slot is slightly greater than the diameter of stud 24 so that the stud can be withdrawn therefrom. The side of the second jaw facing the first jaw further includes a recess 60 into which a clip 62 (shown in FIG. 6) can be inserted. As best seen in FIG. 2, the recess is T-shape and it is dimensioned so that the clip can be placed into the recess with the flat face of the clip protruding slightly past the recess while loops 66 of the clip are disposed in the narrower, inwardly depending portion of the recess. The recess is further dimensioned so that when the lower loop rests against the bottom of the recess a bore 68 in th clip face 64 is aligned with the axis of plunger 26. Thus, if the plunger is released and drives stud 24 in a forward direction the stud protrudes through bore 68 past clip face 64 into solt 54. As is conventional, the clip bore is dimensioned so that it frictionally engages stud 24. In this manner, after the stud has pierced through an earlobe, it is automatically secured thereto to thereby securely retain the stud to the earlobe.

A flat, resilient leaf spring 70 overlies recess 60 and is secured, e.g., riveted to the second jaw 20. The leaf spring rests against face 64 of clip 62, biases the clip into the recess and thus retains the clip to the second jaw.

The operation of earlobe piercing device 2 should now be apparent. To briefly summarize it, the operator first inserts a clip 62 in recess 60 of second jaw 20 by removing the clip from a sterilizing alcohol bath, for example, with a suitable tool such as tweezers and pushing the clip down into the recess until it bottoms.

Thereafter, he grasps bars 4, 6 with one hand, say his right hand and positions the jaws 18, 20 so that the earlobe is disposed between them. He mow manually pulls the bars together. To firmly position the earlobe relative to the jaws an L-shape shoe 74 is mounted to one side of first jaw 18 so that its free leg 76 is parallel to the jaws and perpendicular to the plunger axis. The earlobe is positioned between the second jaw and shoe leg 76. A set screw 77 is threaded into jaw 20 and limits the extent to which the operator can move the jaws towards each other. The operator adjusts the set screw so that the earlobe to be pierced is slightly compressed between jaw 20 and shoe leg 76 when the bars are fully moved towards each other (as determined by the particular setting of the set screw.

The shoe also includes a slot 78 aligned with the plunger axis to permit passage of the plunger shaft but to prevent plunger head 23 from contacting the earlobe and particularly from impacting thereon after release of the plunger. The bottom of slot 78 is dimensioned so that it supports the stud shaft in axial alignment with the plunger to provide positive guidance for the stud as it pierces through the earlobe and enters clip bore 68.

After (or optionally before) the jaws have been compressed against the earlobe the opertor depresses lever 40 to retract plunger 26. Stud 24 is now placed into shoe slot 78 and plunger head 23 is inserted in recess 36 in the plunger. The operator now depresses release lever 48 which permits spring 28 to drive the plunger towards the second jaw and to thereby drive the stud through the earlobe and past the clip bore. The operator now again depresses lever 40 to retract the plunger and disengage it from the stud head. Ear piercing device 2 is now withdrawn in a downward direction away from the earlobe. The stud inserted in the earlobe slides past slots 54 and 78 and the clip frictionally attached to the stud slides out of recess 60 to complete the ear piercing operation including the fastening of the clip to the stud.

I claim:

1. In an earlobe piercing device having first and second jaws mounted for relative movement towards and away from each other for positioning a jaw on each side of an earlobe positioned therebetween, a plunger slidably mounted on the first jaw and including means for engaging an earlobe piercing stud, and means for forcing the plunger in an axial direction towards the second jaw so that an earlobe when placed between the jaws can be pierced with a free end of the stud engaged by the plunger, the improvement comprising: jaws defined by substantially parallel bars having a sufficient length to be hand-held and operated by a user, the plunger being positioned adjacent one end of the bars, first means adjacent the one end and positioned to be operated by fingers of the same hand holding the device for releasing the piston forcing means, and second means positioned adjacent the one end of the bars and also positioned to be operated by a finger of the same hand holding the device for retracting and thereby energizing the plunger forcing means in preparation for a subsequent release thereby by the first means.

2. An earlobe piercing device according to claim 1 including means for adjusting the length of travel of the plunger.

3. An earlobe piercing device according to claim 1 includng means for adjustably limiting the extent to which the jaws can be moved towards each other.

4. In an earlobe piercing device having first and second jaws mounted for relative movement towards and away from each other so that one jaw is adapted to be disposed on each side of an earlobe placed therebetween, drive means mounted to the fist jaw adjacent an end thereof and including means for receiving an earlobe piercing stud for driving the stud along an axial travel path towards and through an earlobe when positioned between the jaws, the improvement comprising a pair of parallel, elongate bars defining the jaws, the bars having a sufficient length to be held and operated by a single hand of a user, means for moving the drive means away from the second jaw to thereby cock the drive means, the moving means including an actuator mounted adjacent the one end of the first jaw and within reach of a user's hand holding the earlobe piercing device, and a release means for the drive means mounted adjacent the one end of the first jaw and positioned for release by the same hand operating the piercing device, whereby the user of the piercing device can with one hand position the device on an earlobe, cock the drive means, and release the drive means to drive the stud through the earlobe.

5. An earlobe piercing device according to claim 4 including shoe means for limiting the movement of the jaws toward each other to thereby define an open gap between the jaws into which an earlobe can be positioned and for further limiting the travel of the drive means towards the second jaw.

6. An earlobe piercing device according to claim 5 including means for terminating the travel of the drive means before it reaches the shoe means.

7. An earlobe piercing device according to claim 4 including means for adjustably limiting the extent to which the bars can be moved towards each other.

8. An earlobe piercing device comprising a pair of elongate, parallel first and second bars, means guiding the bars for movement towards and away from each other, means for biasing the bars apart, means for limiting the maximum extent to which the bars can be biased apart, and means for adjustably limiting the extent to which the bars can be moved towards each other; the bars having a sufficient length to be grasped by an operator's hand for movement of the bars towards each other; the first bar including an axially movable plunger and means for axially movably mounting the plunger adjacent an end of the bar, means for biasing the plunger piston towards the second bar, and means for limiting the extent to which the plunger can move towards the second bar; an end of the plunger facing the second bar including means for receiving an earlobe piercing stud; a first lever mounted to the end of the first bar and connected with the plunger, the first lever being shaped and positioned for grasping by a finger of the hand operating the device and for retracting the plunger in opposition to the biasing means away from the second bar; a second lever mounted to the first jaw adjacent the end including means for retaining the plunger in its retracted position; the second lever being formed and positioned to be operated by a finger of the hand holding the bars for release of the plunger and permitting the biasing means to force the plunger towards the second bar; and means for guiding the stud along an axial travel path aligned with the axis of the plunger into and through an earlobe.

9. A device according to claim 8 includng means defined by the second bar for positioning a stud holding clip having a stud receiving aperture, the holding means including means for resiliently retaining the clip to the second bar.

10. An earlobe piercing device according to claim 9 wherein the resilient holding means comprises a leaf spring having a cutout in alignment with the plunger axis and means securing the leaf spring to the second bar.

11. An earlobe piercing device according to claim 10 including a recess defined by the second bar for receiving and positioning the clip so that the aperture is aligned with the plunger axis, and wherein the leaf spring overlies at least part of the recess so that the spring can engage the clip and retain it to the recess.

12. An earlobe piercing device according to claim 8 wherein the guide means is defined by shoe means rigidly attached to the first bar, the shoe means including a cutout engaging a periphery of the stud for guiding the stud in a straight line when the piston is released.

13. An earlobe piercing device according to claim 12 wherein the shoe means and the second bar define an open space when the bars are proximate each other for receiving and holding an earlobe.

14. An earlobe piercing device according to claim 13 wherein the adjustable limiting means comprises a set screw threaded into one of the bars and having a free end intercepting the other bar when the bars are moved towards each other.

15. An earlobe piercing device according to claim 8 including means for adjusting the extent of travel of the plunger towards the second bar.

* * * * *